(12) United States Patent
Griswold

(10) Patent No.: US 11,330,195 B2
(45) Date of Patent: May 10, 2022

(54) TIME SYNCHRONIZED CAMERAS FOR MULTI-CAMERA EVENT VIDEOS

(71) Applicant: Robert Mark Griswold, Cupertino, CA (US)

(72) Inventor: Robert Mark Griswold, Cupertino, CA (US)

(*) Notice: Subject to any disclaimer, the term of this patent is extended or adjusted under 35 U.S.C. 154(b) by 48 days.

(21) Appl. No.: 16/898,852

(22) Filed: Jun. 11, 2020

(65) Prior Publication Data

US 2020/0396392 A1 Dec. 17, 2020

Related U.S. Application Data

(60) Provisional application No. 62/860,746, filed on Jun. 12, 2019.

(51) Int. Cl.
*H04N 5/247* (2006.01)
*H04N 21/242* (2011.01)
*H04N 7/18* (2006.01)
*H04N 21/218* (2011.01)

(52) U.S. Cl.
CPC ............. *H04N 5/247* (2013.01); *H04N 7/181* (2013.01); *H04N 21/21805* (2013.01); *H04N 21/242* (2013.01)

(58) Field of Classification Search
CPC .. H04N 5/247; H04N 7/181; H04N 21/21805; H04N 21/242
See application file for complete search history.

(56) References Cited

U.S. PATENT DOCUMENTS

| | | | |
|---|---|---|---|
| 9,652,459 B2 | 5/2017 | Dombrowski et al. | |
| 2013/0300937 A1* | 11/2013 | Williams | H04N 5/265 348/581 |
| 2016/0218820 A1* | 7/2016 | Scurrell | H04N 5/0733 |
| 2018/0324410 A1* | 11/2018 | Roine | H04N 5/23238 |

* cited by examiner

*Primary Examiner* — Thai Q Tran
*Assistant Examiner* — Jose M Mesa
(74) *Attorney, Agent, or Firm* — Greenberg Traurig, LLP

(57) ABSTRACT

A video capturing system for a sporting event includes a master clock; a plurality of cameras; and a logging device. The plurality of cameras are arranged to capture different views of participants of the sporting event. Each of the plurality of cameras is configured to capture video of participants of the sporting event. Each of the plurality of cameras includes a clock for tracking time. A logging device includes a processor, a memory, and a clock. The clock of the logging device is time-synchronized with the clocks of the plurality of cameras and the master clock. The logging device is electronically communicable with the plurality of cameras to at least time synchronize the clocks of the plurality of cameras and the master clock.

20 Claims, 9 Drawing Sheets

TIME SYNCHRONIZED CAMERAS FOR MULTI-CAMERA EVENT VIDEOS

RELATED APPLICATIONS

The present application claims priority to U.S. provisional application No. 62/860,746, filed on Jun. 12, 2019, the entirety of which is herein incorporated by reference.

FIELD OF THE TECHNOLOGY

At least some embodiments disclosed herein relate generally to video and image capturing systems and technology. More specifically, embodiments disclosed herein relate to a system of time synchronized cameras capable of generating multi-camera event videos.

BACKGROUND

Capturing video of events such as sporting events with a camera can be difficult and limiting. Typically, a sporting event, e.g., a swim meet or track event, can have a set path or course for participants. To capture video of such events, a spectator or family member of a participant may have a camera capturing video from a position located in designated areas such as the stands. The videographer may be restricted from being near the race course during the event to capture different views of the participant. As such, capturing different and varying views at different locations of the participant during the event is difficult, especially if only a single camera is used and limited to a designated area.

Such sporting events can have timing systems indicating start and finish times of a participant racing on a set path. If there are multiple cameras being used for capturing the sporting event, they are not tied or synchronized to the timing system that is recording the start and finish times of the event for the participant. Thus, when editing the captured video, it is difficult to know the precise time during the event that corresponds to a moment or frame in the captured video of the participant from each independent camera, making it especially difficult to quickly assemble a continuous video of the event using footage captured from multiple cameras.

SUMMARY

A video capturing system for a sporting event includes a master clock; a plurality of cameras; and a logging device. The plurality of cameras are arranged to capture different views of participants of the sporting event. Each of the plurality of cameras is configured to capture video of participants of the sporting event. Each of the plurality of cameras includes a clock for tracking time. A logging device includes a processor, a memory, and a clock. The clock of the logging device is time-synchronized with the clocks of the plurality of cameras and the master clock. The logging device is electronically communicable with the plurality of cameras to at least time synchronize the clocks of the plurality of cameras and the master clock.

In an embodiment, the clock in the logging device or the clock of any of the plurality of cameras can be designated as the master clock. Regardless of which clock is designated as the "master clock," all clocks in the plurality of cameras and the logging device are time synchronized.

A method is also disclosed. The method includes detecting, by a logging device in electronic communication with an electronic timing system, a start signal from the electronic timing system. In response to detecting the start signal, the logging device logs a timestamp and race data of a sporting event in a storage medium connected in electronic communication with the logging device. Video is recorded using a plurality of cameras disposed in different locations of a sporting event from different viewing angles during the sporting event. Videos from the plurality of cameras and logged time and race data are uploaded to a cloud-service.

In an embodiment, the plurality of cameras record a timestamp of every frame while recording video. In an embodiment, the plurality of cameras record a timestamp of at least a first and last frame of the captured video. In an embodiment, the timestamp information can be stored in a metadata file usable to extrapolate the time of every frame in the video file.

A computer-readable storage medium having computer-readable instructions thereon, wherein the computer-readable instructions, when executed, are configured to detect, by a logging device in electronic communication with an electronic timing system, a start signal from the electronic timing system. In response to detection of the start signal, the logging device logs time and race data of the sporting event in a storage medium connected in electronic communication with the logging device, wherein video is recorded using a plurality of cameras disposed in different locations, of the sporting event from different viewing angles. The videos from the plurality of cameras and logged time and race data are uploaded to a cloud-service.

BRIEF DESCRIPTION OF THE DRAWINGS

References are made to the accompanying drawings, which form a part of this disclosure, and which illustrate examples of the systems and methods described herein.

Like reference numbers represent like parts throughout.

DETAILED DESCRIPTION

Figure 1A:
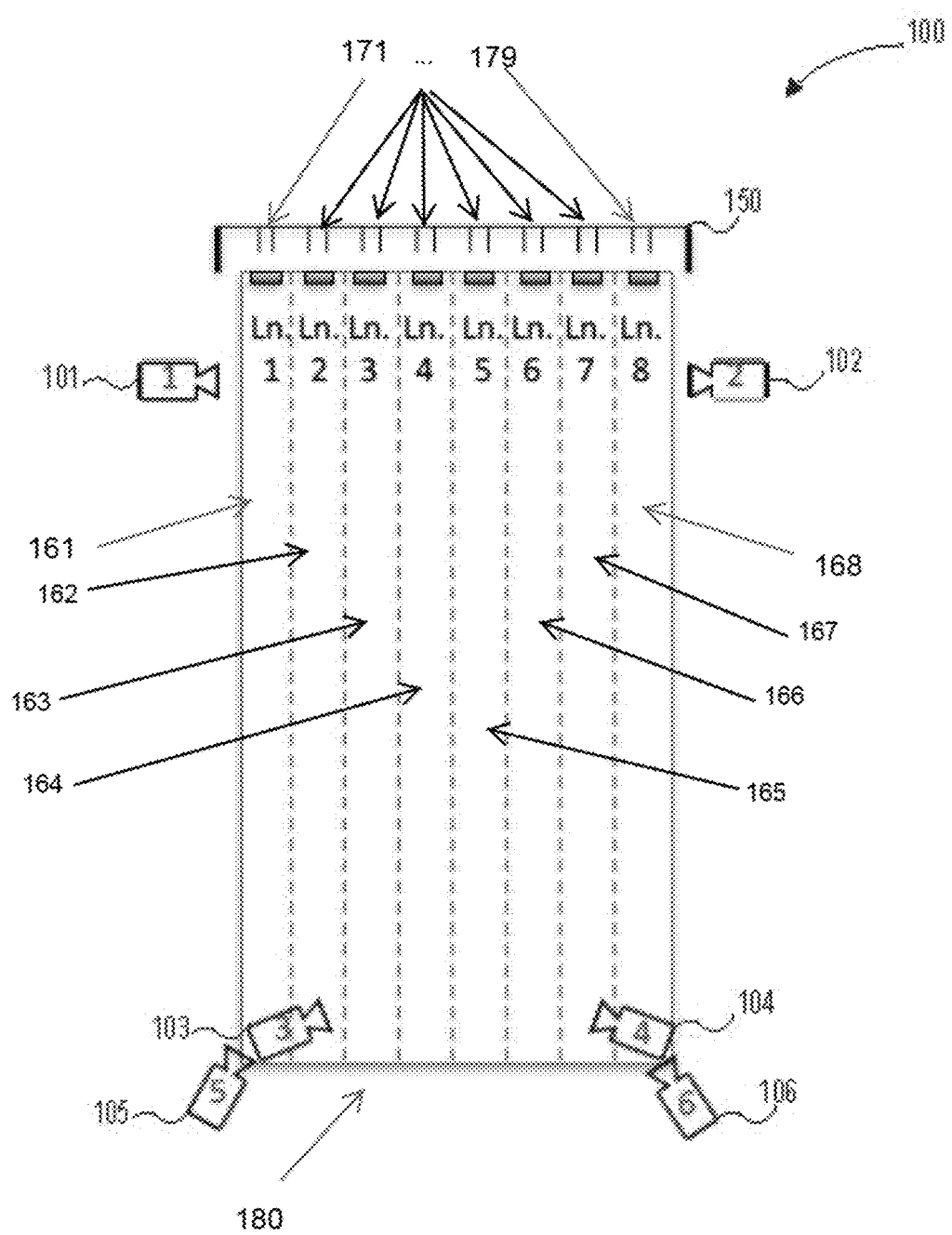
FIG. 1A illustrates one example of a system of cameras at an example sporting event, according to an embodiment.

Capturing video of events such as sporting events with a camera can be challenging. Typically, a sporting event can have a set path or course for participants to race on or around. To capture video of such events, a spectator (e.g., a family member or the like) of a participant may have a camera capturing video from a set or standing position located in designated areas such as the stands. The spectator may otherwise be restricted from being near the race course during the event to capture different views of the participant. As such, capturing different and varying views at different locations of the participant during the event is difficult, especially if only a single camera is used.

Sporting events generally have precise timing systems indicating start and finish times of a participant racing on or around the course. The timing systems are generally not tied or synchronized to camera systems. Thus, when editing video captured by a spectator, it is difficult to know the precise time during the event that corresponds to a moment or frame in the captured video of the participant.

Embodiments described herein are directed to systems and methods that enable improved capturing of video of sporting events. The captured video is synchronized with the electronic timing system to provide a more precise connection to the timing of the sporting event in which the video is captured so that efforts in assembling a multi-camera video of a sporting event is simplified. This is because the integration with the electronic timing system can be used to know when a race starts relative to a video frame corresponding to that start time. Similarly, the time synchronization enables capturing of the frame in each of the video feeds corresponding to a time for switching camera angles.

A system of time synchronized cameras integrated with an electronic timing system for generating multi-camera event videos is disclosed. In one example, a video capturing system includes a system of cameras and a logging device. The system of cameras can capture video of participants of a sporting event. The sporting event uses an electronic timing system to provide precise start times for the sporting event. Each camera of the system can capture a different view of the participants of the sporting event. The logging device can synchronize the plurality of cameras to a master clock so that each camera and the logging device all share the same time with the master clock. In an embodiment, the master clock can be the clock of the logging device or can be one of the camera clocks. The logging device can also be connected to the electronic starting system, the electronic timing system, or a combination thereof, of the sporting event when capturing video of the sporting event so that start times (along with race data) can be captured in a log by the logging device. These start times and recorded race data can later be used to retrieve video captured during the respective times.

An event, as used herein, generally includes a sporting event.

A sporting event, as used herein, generally includes a set path or course performed for a limited duration and to achieve the fastest (i.e., shortest) time for completing the set path or course. The set path or course can be completed one or multiple times, depending on the sporting event. Suitable examples of sporting events include, but are not limited to, a swim meet, a ski event (e.g., skiing or snowboarding), a track event, bicycle racing, car racing, motorcycle racing, or the like. A sporting event includes an electronic timing system. The electronic timing system can also include an electronic starting system for symbolling the start of the sporting event.

Cameras can be placed in set locations to capture different views of the participants throughout the course. The cameras can be situated such that different views or lanes (of the course) can be captured by the cameras without the cameras being individually manned or controlled. The cameras can be time synchronized with a logging device. The logging device is connected in electronic communication with an electronic starting system, an electronic timing system, or a combination thereof, of the sporting event and the multi-camera videos can be time synchronized with the results of individual participants. Such a video capturing system can tie exact frames in video footage from each camera to precise start times for the sporting event.

In an embodiment, the system can provide a more simplified and cost-efficient method for generating multi-camera videos of individual participants of sporting events.

As set forth herein, various embodiments, examples, and aspects will be described with reference to details discussed below, and the accompanying drawings will illustrate various embodiments and examples. The following description and drawings are illustrative and are not to be construed as limiting. Numerous specific details are described to provide a thorough understanding of various embodiments and examples. However, in certain instances, well-known or conventional details are not described to provide a concise discussion of the embodiments and examples.

FIG. 1A illustrates one example of a system 100 of cameras 101 to 106 at an example sporting event, according to an embodiment.

The system 100 can be used to capture multi-camera videos of a sporting event. In the illustrated embodiment, the sporting event is a swimming event at swimming pool 150. It will be appreciated that this is an example of a sporting event and that the actual venue and type of sporting event can vary according to the principles described herein.

In the illustrated embodiment, swimming pool 150 includes eight lanes 161-168. Any number of lanes (e.g., fewer than eight or more than eight) can be used for a swim meet for swimming pool 150. The number of lanes 161-168 having competitors can be less than the number of lanes in the pool. That is, in an embodiment, the swimming pool 150 can include eight lanes, but competitors may be present in some of the lanes, but not all the lanes.

In the system 100, any number and type of cameras 101-106 can be used. For example, the system 100 can include one or more cameras 101-106 above the water, one or more cameras 101-106 below the water, as well as combinations thereof. The system 100 includes at least two cameras 101-106. In an embodiment, the cameras 101-106 may have a changeable view provided the cameras 101-106 still capture a unique view relative to each other. The cameras 101-106 may also have some overlap in their views so that the participant can be captured throughout the course without interruption. Accordingly, overlapping views which still provide different views are unique for purposes of this description.

In the illustrated embodiment, six cameras 101-106 are used. It is to be appreciated that any number of cameras can be implemented for system 100. In general, a single camera can still provide a benefit of identifying appropriate video frames based on time and race data. However, multiple cameras provide a more robust user experience by capturing different views and automatic transitions throughout the race.

The cameras 101-106 can include any camera capable of recording video. Suitable examples of the cameras 101-106 include, but are not limited to, compact or point-and-shoot cameras, zoom compact cameras, advanced compact cameras, adventure cameras, digital single lens reflex (DSLR) cameras, compact mirrorless cameras and medium format camera types, remote cameras connected to a common video recording device (similar to a multi-camera video surveillance system), or camera modules connected to a computing or data processing system as shown, e.g., in FIG. 7, or connected to a microprocessor board such as, e.g., a Raspberry Pi® board. Each camera 101-106 or video recording device contains an accurate clock that can be synchronized to the time of a logging device (see, e.g., FIG. 2).

Each of cameras 101-106 can have one or more memories to store video data and internal clocks. In an embodiment, the cameras 101-106 can include limited memory onboard the camera 101-106 for storing video data and can instead be electronically connected to a memory separate from the cameras 101-106 for storing the video data.

Each of the cameras 101-106 can store a timestamp along with the video data. In an embodiment, the timestamp can be stored for each frame of video captured by each of the cameras 101-106. In an embodiment, the timestamp for at least a first frame and a last frame of the video captured by each of the cameras 101-106 can be stored. In such an embodiment, the timestamp for the frames between the first and last frame can be extrapolated using the first and last frame timestamps.

Although the illustrated system 100 is shown for a swimming event, system 100 can implement multiple cameras 101-106 for other types of sporting events such as, but not limited to, a track event or a racing event in which participants race on or around a set path having start and finish times to place the participants.

Cameras 101-106 can be installed in fixed locations around the swimming pool 150 to capture different views/angles of participants swimming in swimming pool 150. For example, cameras 101 and 102 can capture videos of views on the left and right side of the starting blocks 171-179 of participants swimming in lanes 161-168 of swimming pool 150. Camera 101 can capture video of swimmers in lanes 161-164 and camera 102 can capture video of swimmers in lanes 165-168 at the starting blocks 171-179 of swimming pool 150. Cameras 103 and 104 can capture videos of swimmers under water from the bottom left and right side of turn end 180 of swimming pool 150 of participants swimming in lanes 161-168. Cameras 105 and 106 can capture videos above swimming pool 150 down at the swimmers from the bottom left side and right side of the turn end 180 pointing to lanes 161-168 of participants swimming. These camera placements are examples, and actual camera placement along with what is being recorded can vary according to the principles described herein.

In the illustrated embodiment, because the path of the swimming event is known (i.e., starting at starting blocks 171-179 and finishing at starting blocks 171-179 or at turn end 180), a pattern for transitioning between the cameras can be determined. For example, for a swimmer in lane 161, the pattern would be camera 101, camera 105, camera 103, camera 105, camera 101 in a race in which the start and finish are both at starting block 171. If additional laps of the pool 100 are to be completed, the pattern repeats. This pattern is established based on the course or path of the sporting event. This pattern is established because, for example, it is known that a view starting with camera 105 would not be desirable, as the participant may not even be in view of the camera 105 at the beginning of the race.

Figure 1B:
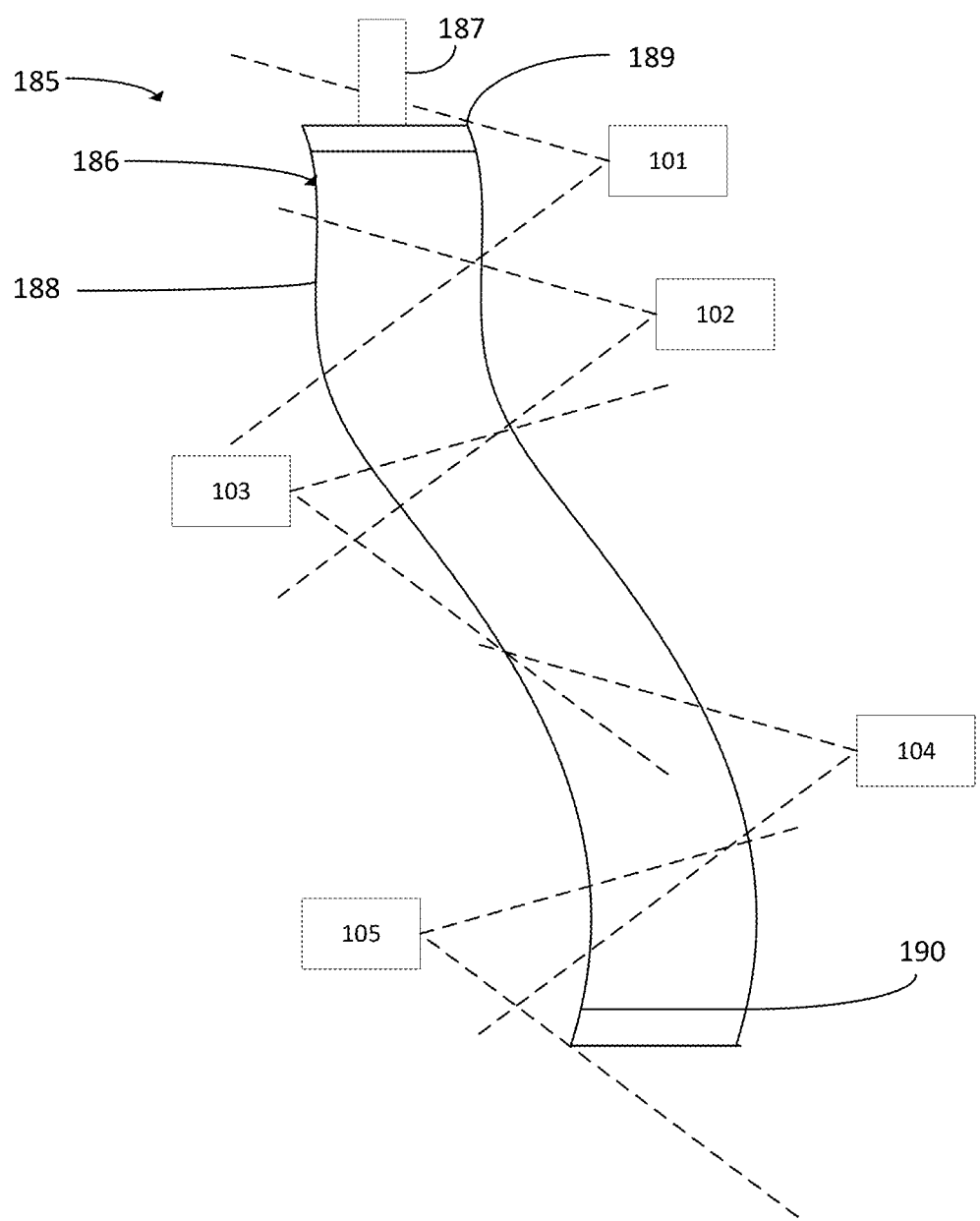
FIG. 1B illustrates another example of a system of cameras at another example sporting event, according to an embodiment.

FIG. 1B illustrates another example of a system 185 of cameras 101-105 at another example sporting event 186, according to an embodiment. The sporting event 186 in the illustrated embodiment is intended to be exemplary and can be representative of any event in which a participant 187 follows a set course 188 (e.g., once) from start 189 to finish 190. It is to be appreciated that the course 188 can be repeated (i.e., participant 187 must return from the finish 190 to the start 189, in which case the start 189 may also represent the end of the race).

The illustrated embodiment shows cameras 101-105 oriented toward the course 188. As can be seen in the figure, the cameras 101-105 are oriented so that the participant 187 can be captured on video from the start 189 to the finish 190. There are areas of overlap between the views of the different cameras 101-105, but the cameras 101-105 are generally oriented to capture unique views of the participant. The cameras 101-105 are placed such that a pattern of transitions between the cameras 101-105 is known. For example, there would be no reason to begin capturing video at camera 105 and then transitioning to camera 101 during a race going from start 189 to finish 190. Rather, a progression including camera 101-camera 102-camera 103-camera 104-camera 105 would provide a view of the participant 187 throughout the entire race from start 189 to finish 190.

In an embodiment, the cameras 101-105 may be movable to change an orientation of the view. In such an embodiment, the pattern (e.g., 101-102-103-104-105) would still be followed. In an embodiment in which the cameras 101-105 are moveable, the cameras 101-105 can include a sensor such as, but not limited to, a motion sensor so that the cameras 101-105 can automatically follow a participant along the course for a portion of the course 188.

Figure 2:
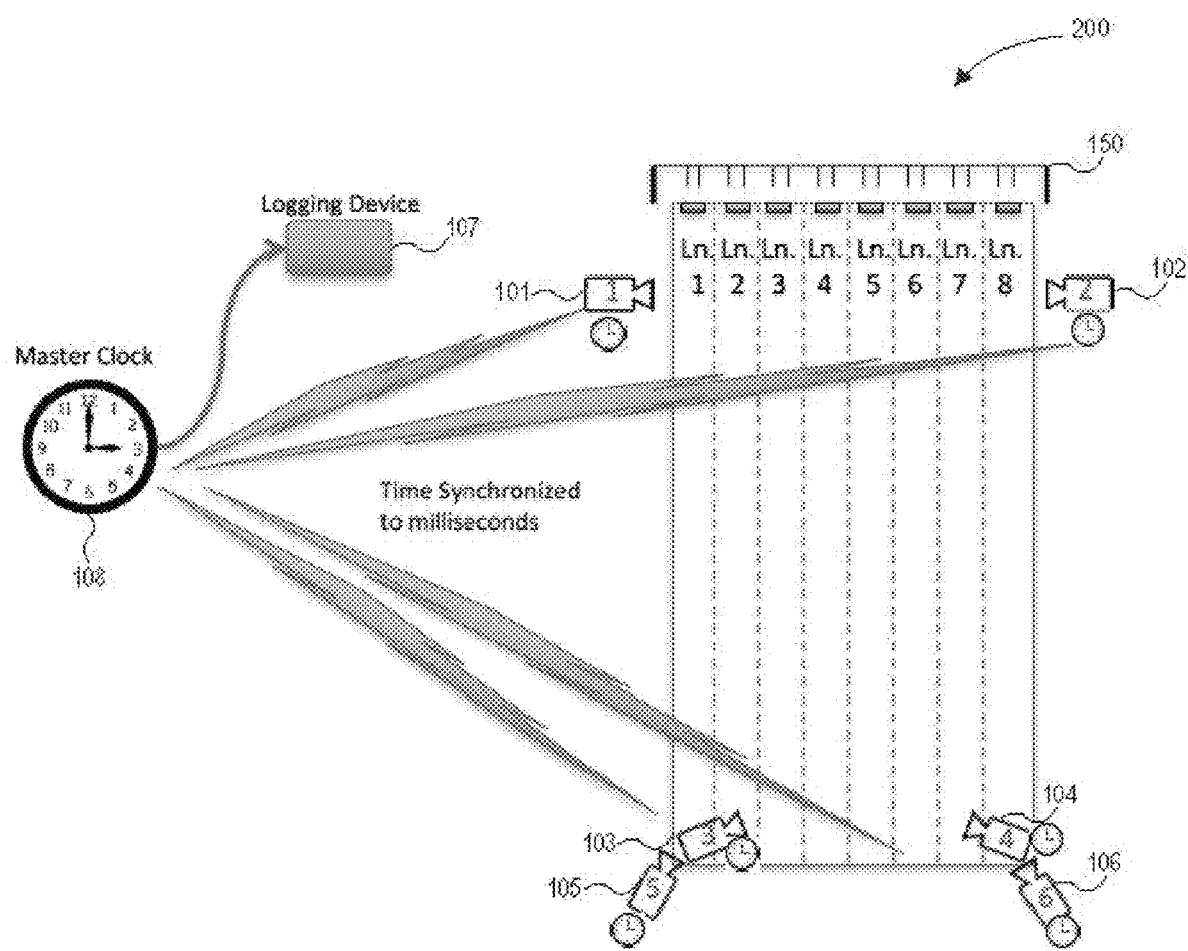
FIG. 2 illustrates one example of a system of cameras time synchronized with a master clock and a logging device to generate multi-camera event videos, according to an embodiment.

FIG. 2 illustrates one example of a system 200 of cameras 101 to 106 time synchronized with a logging device 107 and a master clock 108 to generate multi-camera event videos, according to an embodiment.

In the illustrated embodiment, the system 200 includes cameras 101-106 that are time synchronized with the master clock 108 of the logging device 107. In an embodiment, the master clock 108 can be a clock of one of the cameras 101-106 instead of a clock on the logging device 107. In an embodiment, the time synchronization between the cameras 101-106 and the master clock 108 can be at a selected sensitivity, such as to milliseconds. It will be appreciated that this is an example and that the sensitivity of the time synchronization can vary beyond the stated values.

The sensitivity of the time synchronization is selected so that the master clock 108 and clocks on the cameras 101-106 are within one frame of each other. For example, at 30 frames per second (fps), the time synchronization needs to be within 1/30 of one second. If recording at 60 fps, the time synchronization needs to be within 1/60 of one second. It is to be appreciated that these numbers are examples, and that the cameras 101-106 can record at different frame rates.

In an embodiment, the logging device 107 can be a computing device, mobile computing device, or a data processing system. The logging device 107 can be time synchronized with the cameras 101-106 to synchronize the clocks 101-106 with the master clock 108. In an embodiment, the cameras 101-106 and the logging device 107 can be time synchronized via a wired communication, a wireless communication, or suitable combinations of wired and wireless communication.

The logging device 107 can be configured to synchronize clocks in the cameras 101-106 with the master clock 108. The master clock 108 may be part of the logging device 107 (i.e., a clock embedded in the logging device may be designated as the "master clock" 108). In an embodiment, the clock of any one of the cameras 101-106 can be designated as the "master clock" 108. At the end of the time synchronization process, the logging device 107 and the clock of each of the cameras 101-106 should all be time synchronized to within 1/fps seconds of each other (e.g., 1/30 of a second for 30 fps video, or 1/60 second for 60 fps video) regardless of which of the clocks is the master clock 108.

The time synchronized cameras 101 to 106 can either be two connected devices (a timecode synchronizing device with an internal clock that is then connected to a separate video camera), or the timecode synchronizing functionality and clock can be embedded within the camera itself. It is to be appreciated that the cameras 101-106 may not all be identical, and accordingly, that the time synchronized cameras 101-106 can include combinations of a timecode synchronizing device separate from the camera and a timecode synchronizing device embedded within the camera. For the purposes of the illustrated embodiment, the cameras 101-106 are assumed to be both the video recording devices and the timecode synchronization device. The clocks in each of the time synchronized cameras 101-106 can be synchronized with the master clock 108 in the logging device 107 before any video recording commences.

The time synchronization process can be accomplished wirelessly or by connecting a wire between the logging device 107 and the master clock 108 with each of the time synchronized cameras 101-106. For example, a button could be pushed on the logging device 107 which initiates the rapid "advertisement" of the current time to the millisecond. A button is then pushed on the time synchronized cameras 101-106 which initiates the "listening" for time advertisements from the logging device 107. The time advertisements can be transmitted to the timecode synchronization devices either wirelessly (using Wi-Fi or Bluetooth Low Energy, for example) or over a physical cable. The time synchronized cameras 101-106 and the logging device 107 then pass their version of the time back and forth, with the time synchronized cameras 101-106 setting its internal clock to the last advertised time from the logging device 107 after receiving each advertisement. The process is complete when both devices agree on the exact same time. It is to be appreciated that the pushing of a button does not require a physical button to be pressed on the camera 101-106 or the logging device 107, according to an embodiment. That is, in an embodiment, a device (e.g., a mobile device) connected in communication with the camera 101-106 can include an application or other controller for placing the camera 101-106 into "listening" mode.

In an embodiment, the time synchronization is performed during setup of the system 200 (e.g., a setup mode) and prior to video recording and starting the sporting event. In an embodiment, the time synchronization is not repeated (i.e., time synchronization occurs only once during setup). In an embodiment, the time synchronization can be completed again during the sporting event (e.g., during a break or other downtime in which the sporting event is not ongoing, to ensure that the time synchronization stays accurate). After completion of the setup, the cameras 101-106 can be in a recording mode so that video is constantly recorded (regardless of the race status).

In an embodiment, once the cameras 101-106 and logging device 107 are time synchronized to the master clock 108 time, the cameras 101-106 and the logging device 107 need not be in communication to maintain time synchronization. That is, the cameras 101-106 can record video independently of any actions of the logging device 107.

Figure 3:
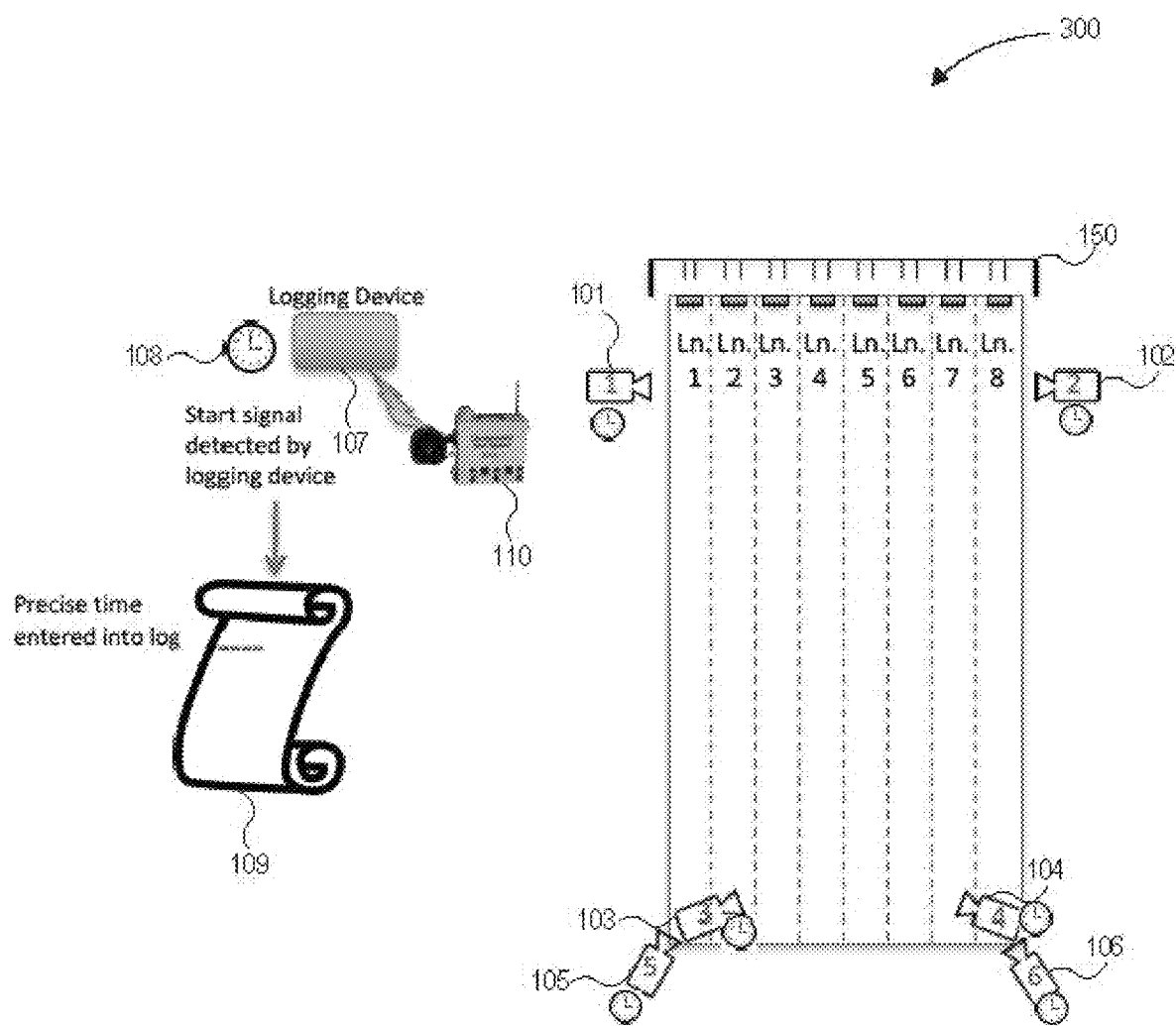
FIG. 3 illustrates one example of a system of cameras time synchronized with a master clock and a logging device connected to an electronic timing system of a sporting event in which the precise times of each race can be logged and therefore tied to exact frames in video footage captured from each camera, according to an embodiment.

FIG. 3 illustrates one example of a system 300 of cameras 101-106 time synchronized with the logging device 107 and the master clock 108, according to an embodiment.

In the illustrated embodiment, the logging device 107 is electronically connected to an electronic starting system 110 of a sporting event (e.g., swim meet at swimming pool 150) in which the precise start times of each race can be logged 109 and therefore tied to exact frames in video footage captured from cameras 101-106.

In an embodiment, upon receiving a start signal from the electronic starting system 110 for the sporting event, logging device 107 can log precise time/timecode data at the instant of the start of every race/event in the log 109. In an embodiment, the log 109 can be stored in a database within logging device 107. In an embodiment, the log 109 can be stored in a cloud storage in electronic communication with the logging device 107. In an embodiment, the log 109 can be stored in a database having a portion within logging device 107 and a portion stored in a cloud storage.

Figure 4:
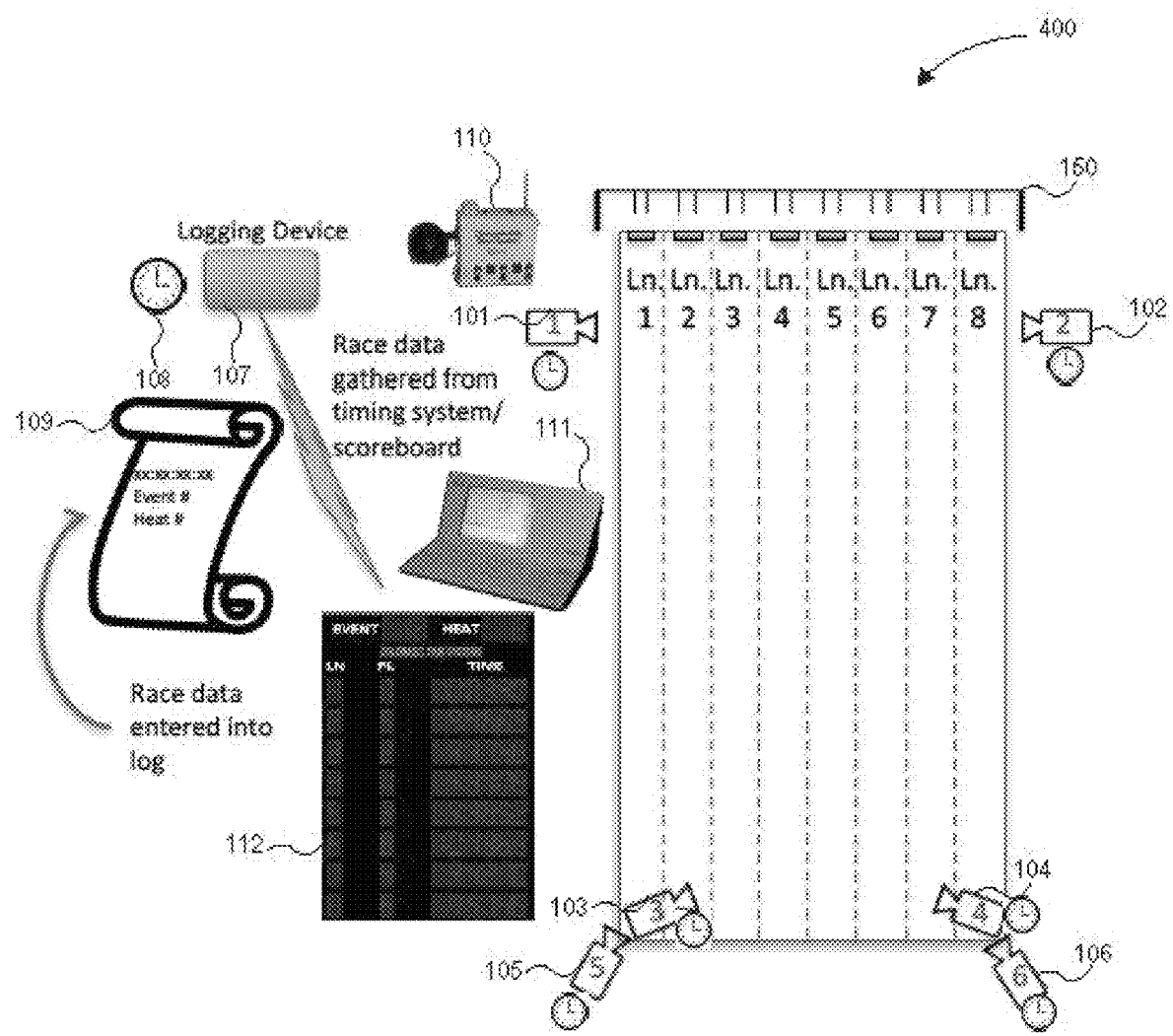
FIG. 4 illustrates one example of a system of cameras time synchronized with a master clock and a logging device connected to an electronic timing system and scoreboard of a sporting event in which exact start times of each race can be logged along with data identifying each race such as event number and heat number, according to an embodiment.

FIG. 4 illustrates one example of a system 400 of cameras 101-106 time synchronized with the logging device 107 and the master clock 108, according to an embodiment.

In the illustrated embodiment, the logging device 107 is electronically connected to the electronic starting system 110 and electronically connected to an electronic timing system 111 and a scoreboard 112 of a sporting event in which exact start times of each race can be logged along with race data 112 identifying each race such as, e.g., event number, heat number, or the like.

In an embodiment, race data 112 can include specific metadata (e.g., event number, heat number, race name, etc.). Race data 112 can be collected and obtained by logging device 107 electronically connected to the electronic timing system 111 or the scoreboard 112 directly. For example, logging device 107 can directly request or query the electronic timing system 110 or the scoreboard 112 in real time and can be stored in log 109 along with time/timecode data. In an embodiment, the sporting event can include additional sensors (e.g., a timing pad at the turn end 180 of the pool 150, which can generate additional timestamps to be recorded and stored in log 109. In another embodiment, even with additional sensors, the additional time information can be queried directly from the electronic timing system 110. In an embodiment, the system may be simpler if querying the information from the electronic timing system 110 after a race is completed instead of monitoring the additional sensors.

Figure 5:
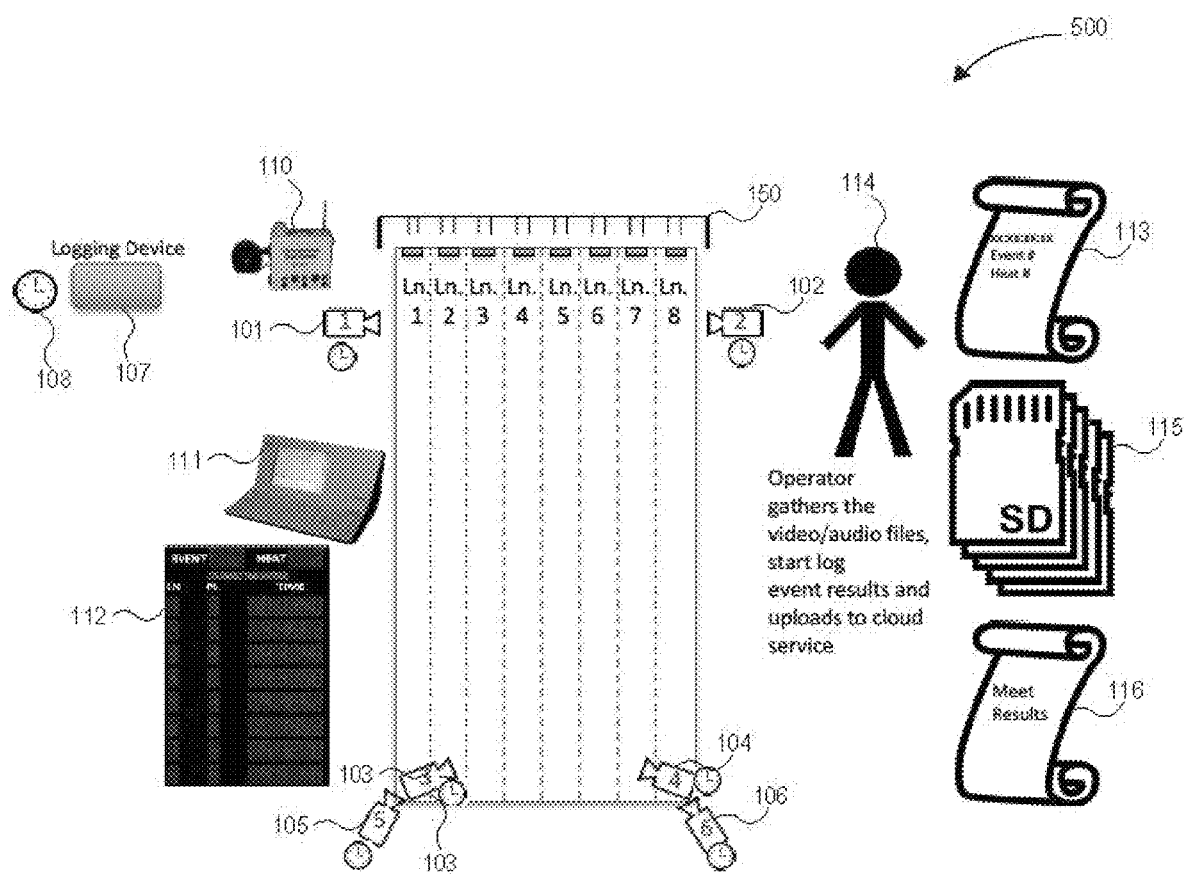
FIG. 5 illustrates one example of a system of cameras time synchronized with a master clock and a logging device connected to an electronic timing system and scoreboard of a sporting event in which race start times can be logged and race data collected, according to an embodiment.

FIG. 5 illustrates one example of a system 500 of cameras 101-106 time synchronized with the logging device 107 and the master clock 108, according to an embodiment.

In the illustrated embodiment, the logging device 107 can be electronically connected to the electronic starting system 110, the electronic timing system 111, and the scoreboard 112 of a sporting event in which race start times can be logged and race data 112 collected and a user or operator 114 collecting comprehensive event results 116, log files 113, and video files 115. In an embodiment, the operator 114 can collect video files 115 including audio data, race data 113 including start logs, and results file 116, and save the data on logging device 107 or upload the collected data to a cloud-based service or cloud storage. In an embodiment, the logging device 107 can be configured to automatically upload the information on a periodic basis (e.g., every hour, few hours, or the like) without operator interaction.

Figure 6:
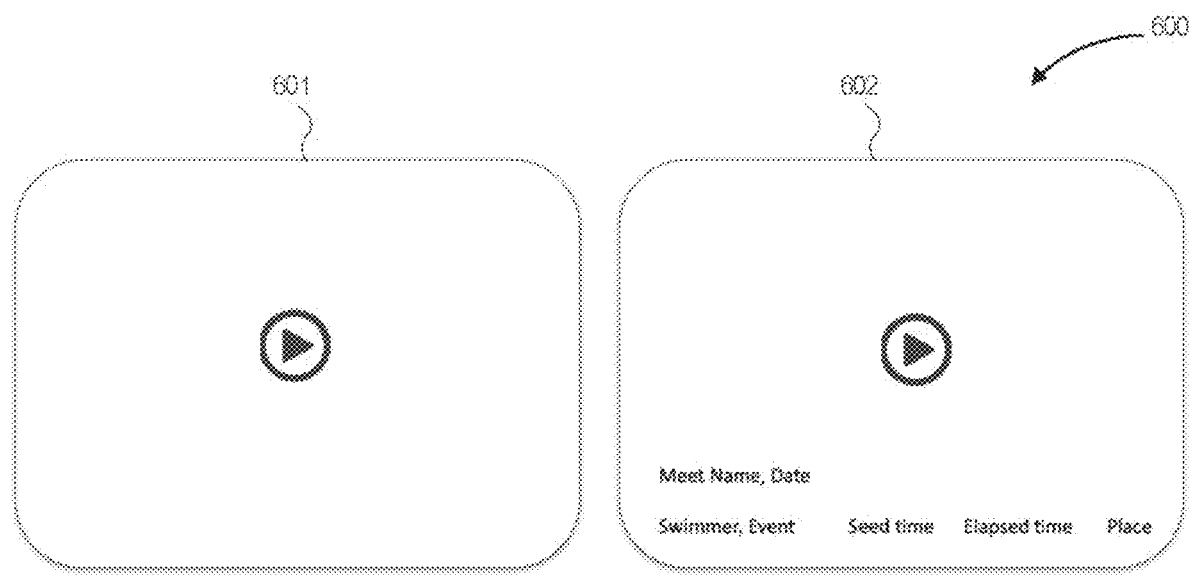
FIG. 6 illustrates one example of a user interface for generating videos and multi-camera videos captured in FIGS. 1-5, according to an embodiment.

FIG. 6 illustrates one example of a user interface 600 for generating videos 601 and 602 of multi-camera videos captured in FIGS. 1-5, according to an embodiment.

In an embodiment, a cloud-based service can be a computing or data processing system in the cloud that provides video rendering services via the user interface 600. For example, an end user or customer can request an individualized or personalized video for a specific participant of the sporting event captured by the system 100, 200, 300, 400 or 500 of FIGS. 1-5.

In an embodiment, the user interface 600 can automate generating a multi-camera sporting event video by assembling consecutive clips from different video files of cameras 101-106 and calculate or estimate camera transition cut points based on data related to a participant of the sporting event such as, e.g., the participant's final race time, length/distance of the sporting event, combinations thereof, or the like. The user interface 600 can create clips from each video file corresponding to the cut points and be assembled into a contiguous race video 601 that can be played or saved.

In an embodiment, the interface 600 including video 601 can include an overlay of relevant race metadata (e.g., meet name, date, swimmer name, event, seed time, elapsed time, place, combinations thereof, or the like). Other metadata can include participant final time and place in heat along with other relevant graphic detail such as, e.g., course highlights, identification of the participant, onto the video 602. In an embodiment, the relevant race metadata may be determined based on the type of sporting event.

The clip system can be arranged any number ways from different views and angles. For example, a "start time clip" can be based on video from cameras 101 and 102 a few seconds before and after the start time; a "full race clip" can be based on cameras 105 and 106; a "turns" clip can be based on cameras 103 and 104 under water a few seconds before and after the turn; and a "finish" clip can be based on video from cameras 101 and 102 a few seconds before and after the finish time. It is to be appreciated that these are examples and that the specific views and angles can be combined in additional ways within the scope of this disclosure. For other examples, the clip system can focus on multi-camera video or a specific participant of the sporting event and provided as videos 601 and 602.

Figure 7:
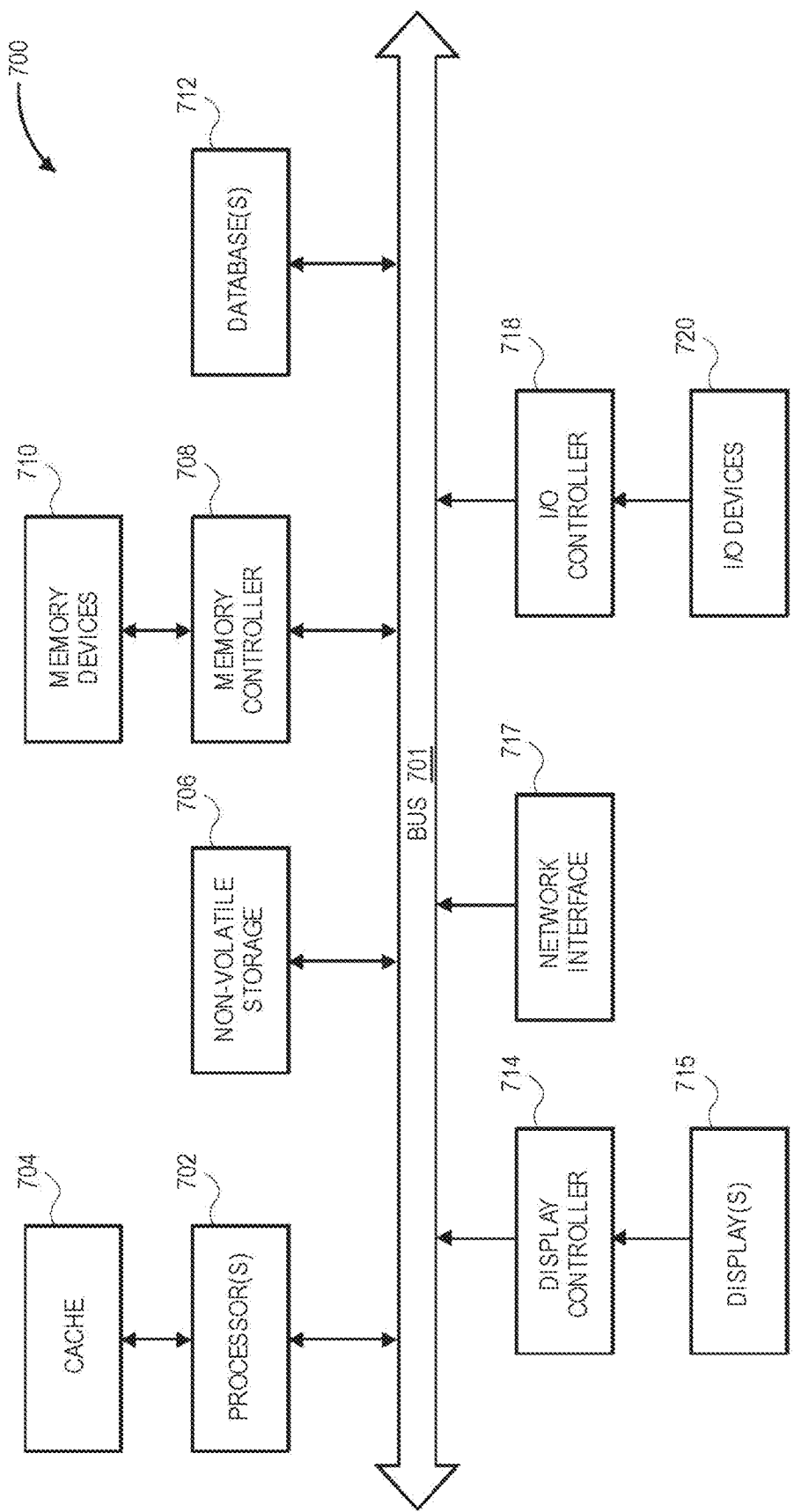
FIG. 7 illustrates one example block diagram of a computing or data processing system that can be used for the system of time synchronized cameras to capture video of a sporting event, according to an embodiment.

FIG. 7 illustrates one example block diagram of a computing or data processing system 700, according to an embodiment. The computing or data processing system 700 can represent logging device 107, a computer or microprocessor board connected to a camera, or a cloud-based system providing a cloud-based service described herein.

Although FIG. 7 illustrates various components of a computing or data processing system 700, the components are not intended to represent any specific architecture or manner of interconnecting the components, as such details are not germane to the disclosed examples or embodiments. Network computers and other data processing systems or other consumer electronic devices, which have fewer components or perhaps more components, may also be used with the disclosed examples and embodiments.

In the illustrated embodiment, computing system 700 includes a bus 701, which is coupled to processor(s) 702 coupled to cache 704, display controller 714 coupled to a display 715, network interface 717, non-volatile storage 706, memory controller coupled to memory 710, I/O controller 718 coupled to I/O devices 720, and database(s) 712. Processor(s) 702 can include one or more central processing units (CPUs), graphical processing units (GPUs), a specialized processor or any combination thereof. Processor(s) 702 can be single-threaded or multi-threaded. Processor(s) 702 can retrieve instructions from any of the memories including non-volatile storage 706, memory 710, or database 712, and execute the instructions to perform operations described in the disclosed examples and embodiments.

Examples of I/O devices 720 include mice, keyboards, printers, cameras and other like devices controlled by I/O controller 718. In an embodiment, the I/O device can be a combined input and output device. For example, the I/O device 720 can be a display having an integrated touchscreen capable of receiving inputs from the user.

Network interface 717 can include modems, wired and wireless transceivers, and combinations thereof, and can communicate using any type of networking protocol including wired or wireless wide area network (WAN) and local area network (LAN) protocols including LTE and Bluetooth® standards.

Memory 710 can be any type of memory including random access memory (RAM), dynamic random-access memory (DRAM), static random-access memory (SRAM), Flash, or combinations thereof, which require power continually to refresh or maintain the data in the memory (i.e., volatile memory). In an embodiment, the memory 710 can be either a volatile memory or a non-volatile memory. In an embodiment, at least a portion of the memory can be virtual memory.

Non-volatile storage 706 can be a mass storage device including a magnetic hard drive, a magnetic optical drive, an optical drive, a digital video disc (DVD) RAM, a flash memory, other types of memory systems, or combinations thereof, which maintain data (e.g. large amounts of data) even after power is removed from the system. In an embodiment, the non-volatile storage 706 can include network attached storage (NAS) or connections to a storage area network (SAN) device, or the like. The non-volatile storage 706 can include storage that is external to the system 700, such as in the cloud.

For one example, memory devices 710 or database 712 can store data related to log 109, electronic starting system 110, scoreboard 111 and race data including video files from cameras 101-106. For other examples, memory devices 710 or database 512 can store videos 601 and 602 of assembled clips of a sporting event. Although memory devices 710 and database 712 are shown coupled to system bus 701, processor(s) 702 can be coupled to any number of external memory devices or databases locally or remotely by way of network interface 517, e.g., database 712 can be secured storage in a cloud environment.

Examples and embodiments disclosed herein can be embodied in a data processing system architecture, data processing system or computing system, or a computer-readable medium or computer program product. Aspects, features, and details of the disclosed examples and embodiments can take the hardware or software or a combination of both, which can be referred to as a system or engine. The disclosed examples and embodiments can also be embodied in the form of a computer program product including one or more computer readable mediums having computer readable code which can be executed by one or more processors (e.g., processor(s) 702) to implement the techniques and operations disclosed herein.

The computer readable medium can include a computer readable signal medium, a computer readable storage medium, or a combination thereof. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result.

Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Figure 8:
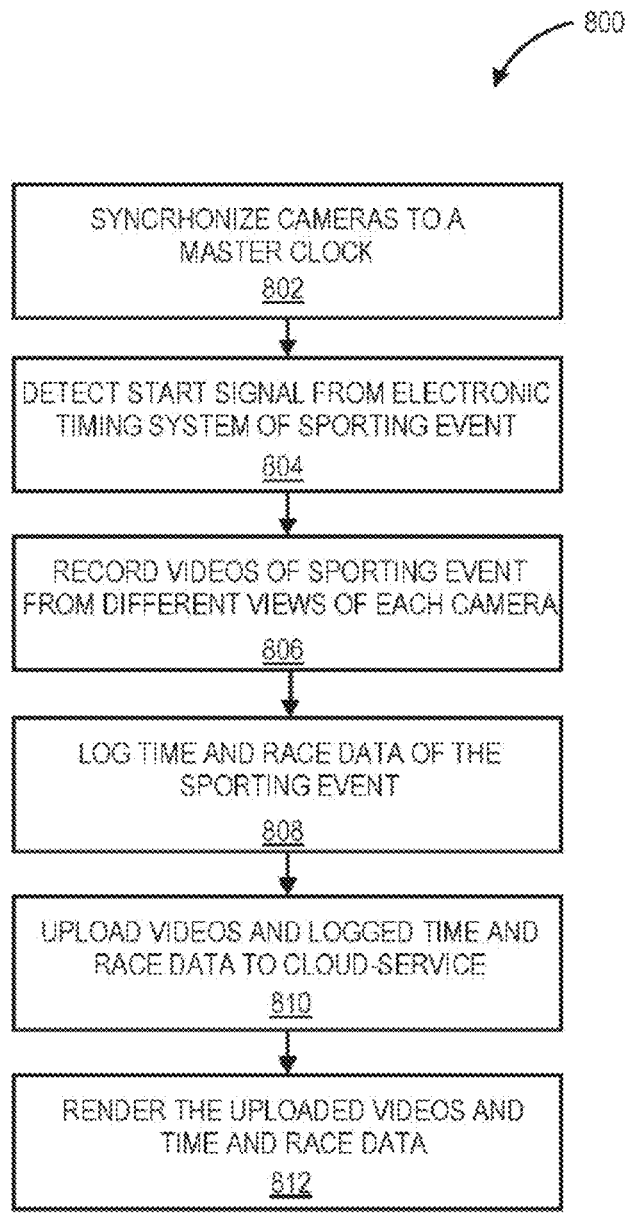
FIG. 8 illustrates one example of flow diagram of an operation for time-synchronized cameras to capture multi-camera video of a sporting event, according to an embodiment.

FIG. 8 illustrates one example of a flowchart for a method 800 for time-synchronized cameras (e.g., cameras 101-106) to capture multi-camera video of a sporting event, according to an embodiment. In one embodiment, the method 800 can be performed with cameras 101-106 arranged and located around a sporting event (e.g., around swimming pool 150).

At block 802, internal clocks of a plurality of cameras (e.g., cameras 101-106) to capture video at different views and angles of a sporting event are synchronized with a master clock (e.g., master clock 108) of a logging device (e.g., logging device 107). In an embodiment, the cameras 101-106 capture a timestamp of at least a first frame and a last frame and store the timestamps as metadata associated with the video. In an embodiment, the cameras 101-106 capture a timestamp of each frame and store the timestamps as metadata associated with the video.

At block 804, a start signal from an electronic timing system of a sporting event is detected. For example, logging device 107 can receive and detect a start signal from electronic starting system 110.

At block 806, videos of the sporting event are recorded by the plurality of cameras 101-106 of different views and angles of the sporting event in which the time (which was synchronized with the master clock 108 at block 802) is recorded in the video footage or in the metadata from each camera 101-106. It is to be appreciated that videos can be captured constantly (i.e., no starting/stopping of the video relative to the start signals).

At block 808, time and race data are logged by the logging device 107. For example, upon receipt of the start signal from the electronic starting system 110, the logging device 107 can log precise time/timecode data at the start of the sporting event.

At block 810, videos that are recorded and time and race data that has been logged are uploaded to a cloud-server.

At block 812, the cloud-service renders the uploaded videos using the logged time and race data. For example, the cloud-service can take user or customer orders for videos and automatically assemble the videos recorded by the time-synchronized cameras by assembling consecutive clips from different video files. The cloud-service can calculate estimated camera transition cut points based on a participant's final race time and the length/distance of the event and create clips from each video file corresponding to these cut points and assembled into a contiguous race video. The cloud service can overlay relevant race metadata (e.g., event name, date, competitor name, seed time, final time, place in heat) along with other relevant graphic detail (e.g., course highlights, identification of athlete) onto the rendered video and delivered to the user or customer who orders it. In an embodiment, block 812 can include extrapolating timestamp data for the videos such as, for example, when the cameras 101-106 only record timestamps for a first and last frame of the video recording.

The terminology used in this specification is intended to describe embodiments and is not intended to be limiting. The terms "a," "an," and "the" include the plural forms as well, unless clearly indicated otherwise. The terms "comprises" or "comprising," when used in this specification, specify the presence of the stated features, integers, steps, operations, elements, components, or combinations thereof, but do not preclude the presence or addition of one or more other features, integers, steps, operations, elements, components, or combinations thereof.

In the foregoing specification, reference has been made to specific examples and exemplary embodiments thereof. It will, however, be evident that various modifications and changes may be made thereto without departing from the broader spirit and scope of disclosed examples and embodiments. The specification and drawings are, accordingly, to be regarded in an illustrative rather than a restrictive sense. The true scope and spirit of the disclosure is indicated by the claims that follow.

What is claimed is:

1. A video capturing system for a sporting event, comprising:
   a master clock;
   a plurality of cameras arranged to capture different views of participants of the sporting event, each of the plurality of cameras configured to capture video of participants of the sporting event, each of the plurality of cameras including a clock for tracking time; and
   a logging device including a processor, a memory, and a clock, the clock of the logging device being time-synchronized with the clocks of the plurality of cameras and the master clock, wherein the logging device is electronically communicable with the plurality of cameras to at least time synchronize the clocks of the plurality of cameras and the master clock,
   wherein the logging device is configured to:
      detect a start signal from an electronic timing system;
      in response to detecting the start signal, log a timestamp and race data of the sporting event in the memory, wherein video is recorded using the plurality of cameras; and
      upload videos from the plurality of cameras and logged time and race data to a cloud-service.

2. The system of claim 1, wherein the sporting event is a swimming event at a swimming pool, a first of the plurality of cameras is disposed underwater, and a second of the plurality of cameras is disposed above water.

3. The system of claim 1, wherein the plurality of cameras store timestamp data for a first frame and a last frame of the video being recorded as metadata.

4. The system of claim 1, wherein the plurality of cameras is electronically communicable with the logging device via a wireless connection during a setup mode.

5. The system of claim 1, wherein one of the clocks of the plurality of cameras is the master clock.

6. The system of claim 5, wherein the clock of the logging device is time synchronized with the one of the clocks of the plurality of cameras that is the master clock during a setup mode.

7. The system of claim 5, wherein one of the clocks of the plurality of cameras is onboard a first of the plurality of cameras.

8. The system of claim 5, wherein one of the clocks of the plurality of cameras is a separate device connected in electronic communication with a first of the plurality of cameras.

9. The system of claim 1, comprising an electronic starting system in electronic communication with the logging device, wherein the logging device is configured to receive an indication of a start of the sporting event from the electronic starting system, and wherein the logging device is configured to store a timestamp of the start of the sporting event in a storage medium, wherein the timestamp is associated with race data in the storage medium.

10. A method, comprising:
  detecting, by a logging device in electronic communication with an electronic timing system, a start signal from the electronic timing system;
  in response to detecting the start signal, logging a timestamp and race data of a sporting event in a storage medium connected in electronic communication with the logging device, wherein video is recorded using a plurality of cameras disposed in different locations of a sporting event from different viewing angles during the sporting event; and
  uploading videos from the plurality of cameras and logged time and race data to a cloud-service.

11. The method of claim 10, comprising:
  rendering the uploaded videos and time and race data.

12. The method of claim 10, comprising:
  before the detecting the start signal from the electronic timing system, synchronizing clocks of each of the plurality of cameras to a master clock.

13. The method of claim 12, wherein the synchronizing the clocks of each of the plurality of cameras to the master clock includes synchronizing to a sensitivity determined by a frame rate of the plurality of cameras.

14. The method of claim 13, wherein the synchronizing the clocks of each of the plurality of cameras comprises broadcasting a time from the master clock to each of the plurality of cameras, wherein each of the plurality of cameras is in a listening mode during the synchronizing.

15. The method of claim 10, wherein the sporting event is a swim meet and the plurality of cameras are arranged to record videos above water and underwater.

16. The method of claim 12, wherein the master clock is a clock of the logging device.

17. The method of claim 12, wherein the master clock is a clock of one of the plurality of cameras.

18. A non-transitory computer-readable storage medium, comprising computer-readable instructions thereon, wherein the computer-readable instructions, when executed, are configured to:
  detect, by a logging device in electronic communication with an electronic timing system, a start signal from the electronic timing system;
  in response to detecting the start signal, log a timestamp and race data of a sporting event in a storage medium connected in electronic communication with the logging device, wherein video is recorded using a plurality of cameras disposed in different locations of a sporting event from different viewing angles during the sporting event; and
  upload videos from the plurality of cameras and logged time and race data to a cloud-service.

19. The non-transitory computer-readable storage medium of claim 18, wherein the computer-readable instructions, when executed are configured to: before the detection of the start signal from the electronic timing system, synchronize clocks of each of the plurality of cameras to a master clock.

20. The non-transitory computer-readable storage medium of claim 18, wherein the sporting event is a swim meet and the plurality of cameras are arranged to record videos above water and underwater.

* * * * *